United States Patent [19]

Voss et al.

[11] 4,101,110
[45] Jul. 18, 1978

[54] MOUNTING ARRANGEMENT FOR AN ADJUSTABLE VEHICULAR SEAT

[75] Inventors: Hans Werner Voss, Wuppertal; Bernd Klüting, Radevormwald, both of Fed. Rep. of Germany

[73] Assignee: Keiper Automobiltechnik GmbH & Co. KG, Remscheid-Hasten, Fed. Rep. of Germany

[21] Appl. No.: 819,828

[22] Filed: Jul. 28, 1977

[30] Foreign Application Priority Data

Jul. 31, 1976 [DE] Fed. Rep. of Germany ....... 2634529

[51] Int. Cl.² ........................................... A45D 19/04
[52] U.S. Cl. ..................................... 248/395; 248/430
[58] Field of Search ............................... 248/393–396, 248/419, 420, 429, 430

[56] References Cited

U.S. PATENT DOCUMENTS

| | | | |
|---|---|---|---|
| 1,684,944 | 9/1928 | Chapman | 248/429 |
| 2,005,112 | 6/1935 | Smelker | 248/395 |
| 2,072,411 | 3/1937 | Smelker | 248/395 |
| 2,225,074 | 12/1940 | Miller | 248/395 |
| 2,953,190 | 9/1960 | Tanaka | 248/395 X |
| 3,022,975 | 2/1962 | Horton et al. | 248/420 |
| 3,552,795 | 1/1971 | Perkins et al. | 248/430 X |

*Primary Examiner*—Lawrence J. Staab

*Attorney, Agent, or Firm*—Michael J. Striker

[57] ABSTRACT

An adjustable seat includes a seat element which is mounted in a motor vehicle for adjustment of the position thereof on two mounting arrangements each of which is arranged at one lateral region of the seat element and each of which includes a first guide track extending substantially horizontally and associated with the front region of the seat element, a support rail telescopically guided on the first guide track and pivotally connected to the seat element on the free front end thereof, an elongated second guide track inclined upwardly in the forward direction and associated with the back region of the seat element, and a support member connected to the rear region of the seat element and supporting the latter on the second guide track. The first guide track and the second guide track are arranged laterally adjacent one another at the associated lateral region of the seat element. In the frontwardly displaced terminal position, the seat element is pivotable about the pivots which connect the front region of the seat element to the free front end portions of the support rails at the two lateral regions of the seat element. A detachable abutment prevents the seat from reaching its terminal position, unless released. A spring is arranged at a distance from the respective pivot between the support rail and the seat element and supports the latter on the support rail.

12 Claims, 3 Drawing Figures

MOUNTING ARRANGEMENT FOR AN ADJUSTABLE VEHICULAR SEAT

BACKGROUND OF THE INVENTION

The present invention relates to an adjustable seat in general, and more particularly to an adjustable seat to be mounted in a motor vehicle or the like.

such adjustable seats are already known and have gained widespread acceptance, particularly in the automobile industry. Such seats may be of any of a variety of constructions, among them such in which the seat element is supported, at each of its lateral regions, on a mounting arrangement which consists of a front guide track associated with the front region of the seat element, and on a separate and distinct rear guide track the direction of which differs from that of the front guide track and which is associated with the rear region of the seat element.

An adjustable seat of this construction is already known, for instance, from the German Pat. No. 766,073 in which, at each of the lateral regions of the seat element, the front guide track slopes upwardly in the forward direction of the seat element to a comparably small extent, while the rear guide track has a steeper slope in the same vertical plane. The seat element is guided in the front guide tracks by means of rollers which are secured against lifting by means of a rail. On the other hand, the rear guide tracks are constructed as suspension rails, and the above-discussed securing of the rollers is dispensed with at the rear guide tracks.

The roller support of the front and of the rear regions of the seat element requires, for a sufficiently long support base, a substantial length of the guide track arrangement because, were it otherwise, the range of adjustment would be disadvantageously and severely limited.

On the other hand, it is also already known from the U.S. Pat. No. 2,953,190 to provide a seat for use in vehicles which is longitudinally adjustable. In this adjustable seat, there is provided, at each of the lateral regions of the seat element, a guide track which is curved over the length thereof and which is anchored to the floor of the motor vehicle, the seat element being guided on such guide tracks by means of support members. A longitudinally oriented toothed rack is rigidly connected to the seat element next to the support members, and a pinion driven by an electric motor meshes with such a toothed rack. The seat element is held in the respectively selected longitudinal position thereof as a result of the self-locking feature of the drive or transmission, in particular of a worm transmission interposed between the motor and the pinion. Even in such seats in which a longitudinally extending guide track is arranged at each lateral region of the seat element and in which the rear as well as the front region of the seat element is supported, the same problem as explained above is encountered, that is, given a certain length of the guide track, the range of adjustment of the seat element is rather small or, for a predetermined adjustment range, the length of the mounting arrangement is rather great.

There is also already known from the U.S. Pat. No. 3,079,118, an adjustable seat to be arranged in a motor vehicle in which the seat element is shiftable in a longitudinally extending guiding arrangement by means of an electromotor and a transmission which includes a crank and a connecting rod. The structural arrangement which constitutes the guiding arrangement is supported, at its both end regions, by pivotable levers which are selectably driven by means of an electromotor. As a result of this, the longitudinal position, the height, and the inclination of the seat element can be adjusted to the requirements or wishes of the user of the adjustable seat. A sole electromotor is provided in this arrangement which can be switched to drive the various transmissions by means of electromagnetically energizable couplings. Seats of this kind are expensive and have relatively huge weights. Also, they require a substantial structural length as compared to the achievable range of adjustment. In addition thereto, there exists the danger of operational difficulties or malfunction. Furthermore, the adjustment presupposes a technical understanding in order for the user of the adjustable seat to be able to exactly and quickly achieve the desired position of the seat.

SUMMARY OF THE INVENTION

Accordingly, it is a general object of the present invention to avoid the above-discussed disadvantages.

More particularly, it is an object of the present invention to provide an adjustable seat, particularly for use in motor vehicles, which is not possessed of the disadvantages of the prior-art adjustable seats.

Yet another object of the present invention is to so construct the adjustable vehicular seat as to achieve a comparatively broad adjustment range while keeping the structural length of the adjustable seat to a minimum.

A concomitant object of the present invention is to provide a seat which is simple in construction, low in weight, inexpensive to manufacture and maintain, and reliable and long-lasting in operation.

In pursuance of these objects and others which will become apparent hereafter, one feature of the present invention resides, briefly stated, in an adjustable seat, particularly a motor vehicle seat, which comprises, in combination, a seat element having a front, rear and lateral regions; and means for mounting said seat element for adjustment of the position thereof, including two mounting arrangements each arranged at one of said lateral regions of said seat element and each including first support means associated with said front region and second support means associated with said rear region of said seat element, said first support means including an elongated first guide track extending substantially horizontally, a support rail telescopically guided on said first guide track and having a free front end, and a pivot connecting said front region of said seat element to said front end of said support rail for pivoting relative thereto, said second support means including an elongated second guide track which is inclined upwardly in the forward direction, and a support member connected to said rear region of said seat element and supporting the latter on said second guide track, said second support means being arranged laterally adjacent said first support means.

In this construction, the guide tracks which are associated with the front region and the rear region of the seat element and which are arranged at the lateral regions of the seat element, are partially coextensive with one another, that is, they overlap each other in the direction of adjustment of the seat element. Furthermore, the seat element is supported on the guide tracks in different ways, namely, at the front region thereof, by a support rail at each lateral region thereof, while being immediately guided at the rear region thereof in the second guide tracks associated with the two lateral regions thereof. The support rails operate, in the embodiment of the present invention, as extensions which are displaced out of the front guide tracks to a predetermined extent. Thus, a supporting telescopic arrangement results from the above-discussed arrangement for each of the front regions of the seat element. As a result of this, there is obtained a considerable range of adjustment for the seat element, while the length of the mounting arrangement is kept to a minimum and while a sufficient support base is assured. The compact construction which is achievable according to the present invention requires only a small weight of the components which constitute the two mounting arrangements. In addition thereto, there is achieved a long-lasting operability and security, inasmuch as the support rails, as a result of the overlap of the two guide tracks of each mounting arrangement as proposed by the present invention, can be supported on the front guide track along a portion thereof which is sufficient for satisfying all of the requirements.

The basic concept of the present invention discussed above can be utilized in a variety of constructions. In an advantageous embodiment of the present invention, said second guide track has a forward end having such a configuration as to permit said seat element to pivot about said pivots of said mounting arrangement in a forwardly displaced terminal position of said seat element. Then, abutment means may be provided which limits the movement of said seat element toward said terminal position thereof. When the abutment means is released, the seat element can reach the terminal position and can thereafter be tilted. Preferably, the second guide track is of a generally U-shaped configuration including a web and a lower and an upper arm extending transversely of said web. Under these circumstances, the support member is received between and supported on said arms of said guide track, the upper arm having a cutout at said forward end thereof through which said support member passes during said pivoting in said terminal position. Advantageously, the abutment means includes an abutment member which is detachably mounted on said forward end portion of said second guide track and which is operative for abutment with said support member prior to reaching of said terminal position of said seat element. The release of the abutment member permits the support member to enter the portion of the second guide track which is juxtaposed with the cutout, whereupon the seat element can be lifted off the second guide tracks, the support members passing through the associated cutouts. Such a tilting of the seat element is desirable and advantageous for inspection and repair purposes.

In the arrangement of the present invention, a desired ease of adjustment of the seat element, even in the loaded condition thereof, can be achieved when, according to a further expedient of the present invention, at least one spring is mounted in each of said mounting arrangements between said support rail and said seat element, such spring supporting the seat element on the support rail at a distance from said pivot. Preferably, the spring is pre-stressed. The pre-stressing of such springs can be so selected that, in a central longitudinal position of the seat element, the weight of the user of the seat is fully compensated for so that the forwardly and upwardly sloping second guide track is substantially unloaded. This has the advantage that, during the guiding of the seat element in the second guide tracks, only very small frictional forces are to be overcome and especially, even when the slope of the second guide tracks is relatively steep, only small weight components are to be counteracted during the lifting of the rear region of the seat element. On the other hand, the additional loading of the support rails is insubstantial, in that these extend substantially horizontally. Such weight-compensating arrangements are especially advantageous when the longitudinal adjustment of the seat element is to be achieved by resorting to the use of an electric motor. In the latter instance, the seat further comprises means for adjusting the position of said seat element, which includes a drive, preferably an electric motor, a toothed rack rigidly connected to said support rail, and at least one gear wheel driven in rotation by said drive and meshing with said toothed rack. This results in a particularly simple and accessible construction.

The support of the rear region of the seat element in the second guide tracks can also be accomplished in a variety of ways. However, it is particularly advantageous as proposed by the present invention, to provide said seat element with a carrier member at each of said lateral regions thereof which is connected to the respective pivot of the respective mounting arrangement, a transverse member extending between and rigidly connected to said carrier member and respective substantially vertically extending brackets at the respective carrier members and connected to said transverse member. Then, said support members associated with said second guide tracks of said mounting arrangements may be mounted on said brackets, respectively. Advantageously, each of said support members includes a pin rigid with said seat element and a body of rotation, preferably of a synthetic plastic material, rotatably mounted on said pin.

In such an arrangement, it is further advantageous to equip the brackets with free end portions which are so configurated as to engage behind said second guide tracks for maintaining said support members in engagement with said second guide tracks over at least a major part of the elongations of the latter. To achieve this, said second guide tracks may have vertically bent lower guiding arms so that said free end portions may be configurated as tongues which engage with said guiding arms in a hooklike manner. Such securing arrangements are effective when, as a result of unexpected or excessive load conditions, elastic or even plastic deformations take place which could otherwise impair the reliability of the engagement of the support members with the second guide tracks.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
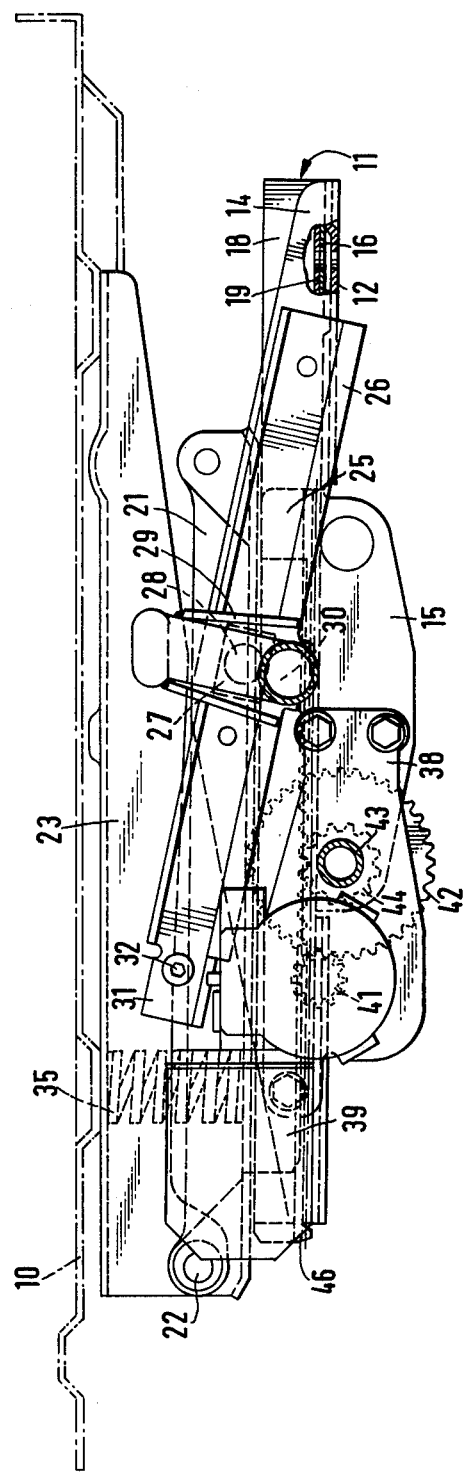
FIG. 1 is a side elevational view of a mounting arrangement according to the present invention as used in a motor vehicle in connection with a seat element only diagrammatically indicated herein.
Figure 2:
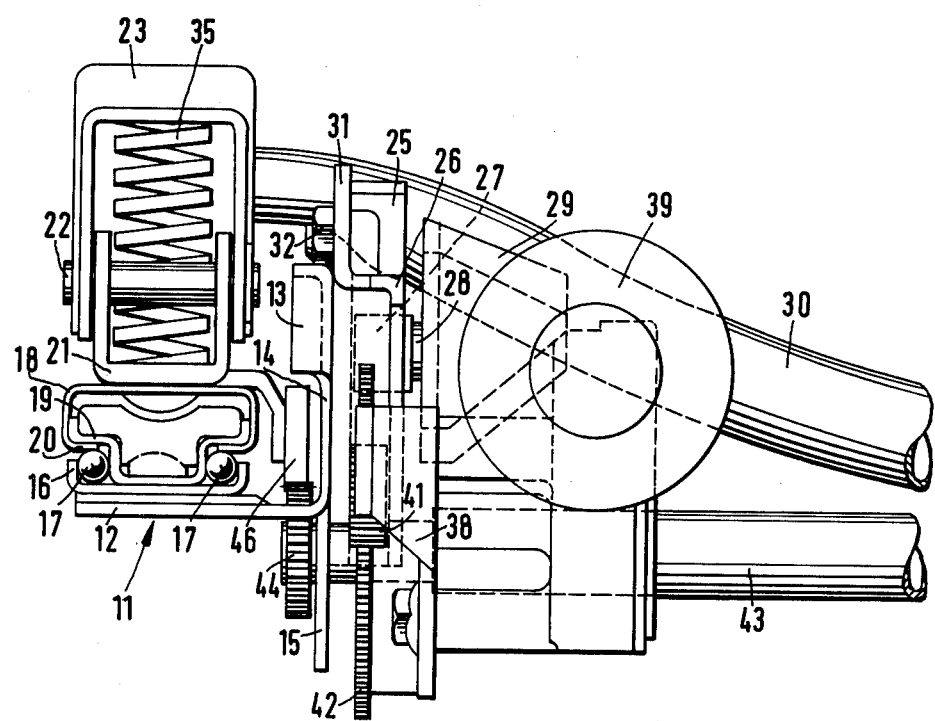
FIG. 2 is a front elevational view of the arrangement of FIG. 1.
Figure 3:
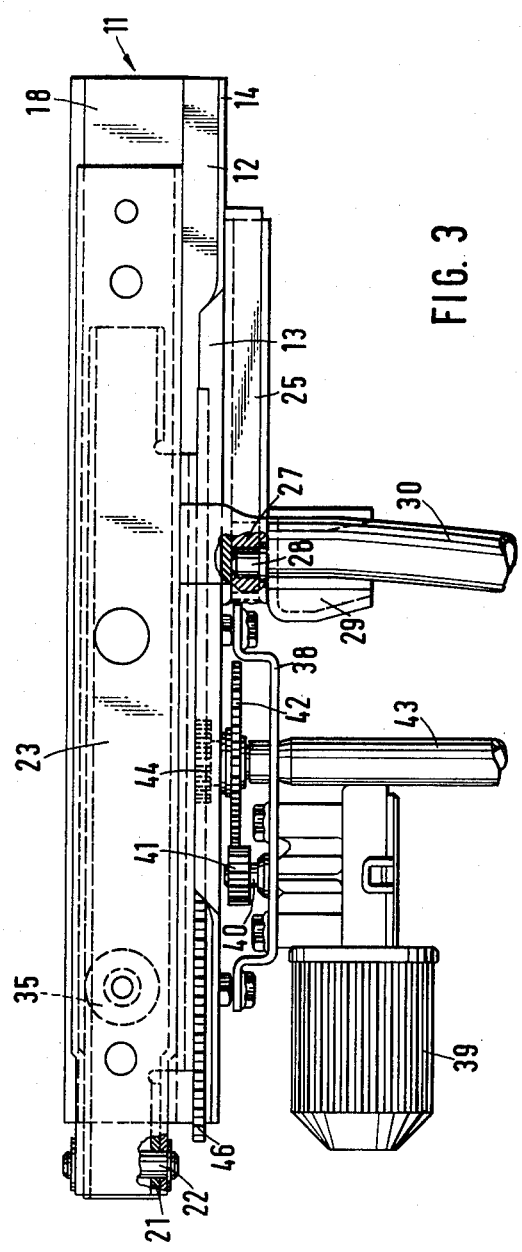
FIG. 3 is a top-plan view of the arrangement of FIG. 1.

DESCRIPTION OF THE PREFERRED EMBODIMENTS:

Referring now to the drawing in detail, it may be seen therein that the reference numeral 10 designates a seat element of an adjustable seat, which is indicated in the drawing only in phantom lines. A mounting arrangement is provided at each of the lateral regions of the seat element 10 and is operative for mounting the latter, for instance, in a motor vehicle, for longitudinal displacement, that is, for displacement forwardly and rearwardly. Each of the mounting arrangements includes a first guide track 11 which is angularly profiled at the end regions thereof and is elongated. The guide track 11 has horizontal arm zones 12 by means of which it is connectable to corresponding zones of the floor of the motor vehicle. The guide track 11 further has a web 14 which is bent at its upper marginal portion at a zone 13. The vertical web 14 is extended, over a portion of its length, and at a lower region thereof, to form a support portion 15. The guide tracks 11 which are respectively associated with the two lateral regions of the seat element 10 are mirror-symmetrically identical with one another, and the same is also valid about their arrangement. The same is also true for most of the other components of the mounting arrangement, so that it will be sufficient to describe one of the mounting arrangements associated with one of the lateral regions of the seat element 10, and the other mounting arrangement associated with the other lateral region of the seat element 10 will then be configurated and arranged accordingly.

At the upper side of the horizontal arm zone 12, there is attached an elongated guide rail 16 which is formed with two races 4 respectively accommodating two bearing ball rows 17. A substantially C-shaped profiled support rail 18 is supported on the bearing ball rows 17, being secured against lifting from the bearing ball rows 17 by means of an abutment rail 19 which is connected with the guide rail 16. The abutment rail 19 overlaps and embraces the inwardly bent shoulders 20 of the support rail 18 with certain play. The shoulders 20, on their outward sides, are equipped with a race each, for accommodating the respective bearing ball row 17.

The support rail 18 is connected to a substantially Z-shaped carrier rail 21 and forms therewith a carriage rail. The carrier rail supports, in a frontwardly located bearing block thereof, a pivot 22. The pivot 22 determines a pivot axis of a coupling joint which articulates the free end portion of the carrier rail 21 to an elongated carrier 23 rigidly connected to the seat element 10 and arranged underneath the same at each of the lateral regions of the seat element 10, for pivoting relative thereto. Preferably, the other end portion of the carrier rail 21 is also equipped with a bearing block adapted to receive a pivot 22 so that the carrier rail 21 is adapted for use in each of the mounting arrangements associated with the two lateral regions of the seat element 10. In other words, the carrier rail 21 is so configurated that, upon reversal of position, it can be selectively used in either one of the mounting arrangements.

To the vertical web 14 of each guide track 11, there is connected a rail 25 which constitutes a second guide track. The rail 25 is profiled into a generally U-shaped configuration, and the web thereof is located adjacent to the vertical web 14 of the respective first guide track 11. The rail 25 is elongated and is laterally offset with respect to the first guide track 11 and the various component parts thereof. In contradistinction to the first guide track 11 which extends substantially horizontally, the rail 25 constituting the second guide track slopes upwardly in the direction to its forward end. The lower support arm of the rail 25 is vertically bent to form a guiding portion 26.

At each of the lateral regions of the seat elements 10, a support element 27 extends into and is supported in the respective rail 25. The support element 27 is preferably made of synthetic plastic material, is advantageously of a parallelepiped configuration, and is rotationally mounted on a pin 28. The pin 28 is mounted on a substantially vertically extending bracket 29 which is welded to a cross tie 30 which extends between the carrier elements 23 rigidly connected to the seat element 10 and serving as a transverse reinforcement.

At the front end region 31, the arms of the rails 25 are provided with cutouts. The region 31 is delimited by a screw 32 which serves as an abutment. The screw 32 has to be removed before the support element 27 can penetrate into the region 31. In this connection, it is to be mentioned that the dimensions of the various parts are so selected that the support elements 27 penetrate into the respective regions 31 prior to the abutment of the rail arrangement 18, 21 in the frontwardly displaced position thereof. In this terminal position, the seat element 10 is released from the rail 25 so that it can be tilted about the common axis of the pivots 22 of the coupling joints, at its rear region. This renders inspection and repair of the mounting arrangements simple and easy.

In each of the mounting arrangements, a helical compression spring 35 is arranged between, and prestressed by, the carrier rail 21 which forms a component of the first guide track and the associated carrier element 23 which is rigid with the seat element 10, at a rearward distance from the pivot 22 constituting the articulating joint. The spring is prestressed in such a manner that it substantially counteracts or balances the torque which results from the application of the weight of an average seat user, the torque being measured with respect to the pin 22 of the articulating joint. As a result thereof, there is achieved that the support elements 27 press against the rail 25 only with a small force. As a consequence thereof, the friction between the support element 27 and the rail 25 is kept at a low value and particularly a considerably great part of the lifting work which would otherwise have to be expended during the adjustment of the position of the seat element, and which results from the fact that the rails 25 have an upward slope, is avoided. The position of the seat element 10 is always precisely determined by the rails 25, despite the resilient support thereof by the springs 35.

A support bridge 38 is connected by screws or the like, to the vertical web 14 and to the carrier bracket 15 of the guide track 11. This bridge 38 could be, at least partially, held by a snap-action connecting arrangement. The supporting bridge 38 carries an electrical driving motor 39 having an output shaft 40 on which there is mounted a toothed pinion 41. A larger toothed wheel 42 meshes with the pinion 41 and is mounted on an intermediate shaft 43 which extends all the way to the other lateral region of the set element 10. The intermediate shaft 43 has mounted thereon, at both lateral regions of the seat element 10, a toothed wheel 44. Both toothed wheels 44 are interconnected for joint rotation by the intermediate shaft 43. It is advantageous to arrange a conventional coupling in the transmission driving the intermediate shaft 43, which coupling renders it possible to separate the intermediate shaft 43 from the motor drive which is self-locking.

At each of the lateral regions of the seat element 10, a toothed rack 46 which is connected with the carriage rail arrangement 18, 21 meshes with the respective toothed pinion 44. Preferably, the toothed rack 46 is connected to the lower vertical arm of each of the carrier rails 21.

In the operating condition, the seat element 10 rests, by means of the carriers 23 attached thereto at its lateral regions, and by means of the pivot 22 of the articulating joints at the front end thereof, on the carriage rail arrangement 18, 21, while the seat element, at its rear region, is supported on the rail 25 of each lateral region of the seat element which constitutes the second guide track, via the cross tie 30 interconnecting the carriers 23, and via the brackets 29 with the support elements 27. In addition thereto, a greater part of the weight of the user of the seat element 10 is transmitted by the springs 35 to the rail arrangement 18, 21 as a result of the fact that the springs 35 are arranged between the carriage rail 18, 21 and the associated carrier 23. Resorting to the use of the motor 39, it is possible to displace the seat element in the longitudinal direction of the motor vehicle in which the seat element 10 is mounted, due to the action of the pinion 44 which, at each lateral region of the seat element 10, meshes with the toothed rack 46. During such displacement, the front region of the seat element 10 retains its elevation as a result of the fact that the guide rail 16 extends substantially parallel to the floor of the motor vehicle, while the rear region of the seat element 10 changes its elevation as a result of the sloping orientation of the rails 25 which constitute the second guide track associated with the rear region of the seat element 10. For inspection and/or repair purposes, the seat element 10 can be displaced, after the removal of the abutment screws 32, to its terminal position in which its support elements 27 are located at the forward end portion 31 of the rail 25, whereupon the seat element 10 can be tilted about the pivot axis of the pivot 22 of the articulating joint in the upward direction, while the support elements 27 emerge from their previous confinement in the rail 25.

It will be understood that each of the elements described above, or two or more together, may also find a useful application in other types of constructions differing from the types described above.

While the invention has been illustrated and described as embodied in an adjustable seat for use in a motor vehicle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an adjustable seat, particularly a motor vehicle seat, a combination comprising a seat element having front, rear and lateral regions; and means for mounting said seat element for adjustment of the position thereof, including two mounting arrangements each arranged at one of said lateral regions of said seat element and each including first support means associated with said front region and second support means associated with said rear region of said seat element, said first support means including an elongated first guide track extending substantially horizontally, a support rail telescopically guided on said first guide track and having a free front end, and a pivot connecting said front region of said seat element to said front end of said support rail for pivoting relative thereto, said second support means including an elongated second guide track which is inclined upwardly in the forward direction, and a support member connected to said rear region of said seat element and supporting the latter on said second guide track, said second support means being arranged laterally adjacent said first support means.

2. A combination as defined in claim 1, wherein said second guide track has a forward end having such a configuration as to permit said seat element to pivot about said pivots of said mounting arrangements in a forwardly displaced terminal position of said seat element; and further comprising abutment means for limiting the movement of said seat element toward said terminal position thereof.

3. A combination as defined in claim 2, wherein said second guide track is of a generally U-shaped configuration including a web and a lower and an upper arm extending transversely of said web; wherein said support member is received between and supported on said arms of said second guide track; and wherein said upper arm has a cutout at said forward end thereof through which said support member passes during said pivoting in said terminal position.

4. A combination as defined in claim 2, wherein said abutment means includes an abutment member detachably mounted on said forward end portion of said second guide track and operative for abutment with said support member prior to reaching of said terminal position of said seat element.

5. A combination as defined in claim 1; and further comprising at least one spring in each of said mounting arrangements mounted between said support rail and said seat element and supporting the latter on the former at a distance from said pivot.

6. A combination as defined in claim 1; and further comprising means for adjusting the position of said seat element, including a drive, a toothed rack rigidly connected to said support rail, and at least one gear wheel driven in rotation by said drive and meshing with said toothed rack.

7. A combination as defined in claim 6, wherein said drive includes an electric motor.

8. A combination as defined in claim 1, wherein said support member includes a pin rigid with said seat element and a body of rotation rotatably mounted on said pin.

9. A combination as defined in claim 8, wherein said body is of a synthetic plastic material.

10. A combination as defined in claim 1, wherein said seat element includes a carrier member at each of said lateral regions thereof and connected to the respective pivot of the respective mounting arrangement, a transverse member extending between and rigidly connected to said carrier members, and respective substantially vertically extending brackets at the respective carrier members and connected to said transverse member; and wherein said support members associated with said second guide tracks of said mounting arrangements are mounted on said brackets, respectively.

11. A combination as defined in claim 10, wherein said brackets have free end portions which engage behind said second guide tracks so as to maintain said support members in engagement with said second guide tracks over at least a major part of the elongations of the latter.

12. A combination as defined in claim 11, wherein said second guide tracks have vertically bent lower guiding arms; and wherein said free end portions are configurated as tongues which engage said guiding arms in a hook-like manner.

* * * * *